Dec. 3, 1968 B. REIDEL 3,414,818

COMPANDING PULSE CODE MODULATION SYSTEM

Filed June 1, 1965

INVENTOR
BERTHOLD REIDEL

BY Percy P. Lantzy
ATTORNEY

United States Patent Office 3,414,818
Patented Dec. 3, 1968

3,414,818

COMPANDING PULSE CODE MODULATION SYSTEM

Berthold Reidel, Stuttgart, Germany, assignor to International Standard Electric Corporation, New York, N.Y., a corporation of Delaware Filed June 1, 1965, Ser. No. 460,369
Claims priority, application Germany, June 3, 1964, St 22,202
15 Claims. (Cl. 325—38)

ABSTRACT OF THE DISCLOSURE

The compressor-encoder includes a detector to detect the polarity of a bipolar PAM signal and produce a polarity control signal, a full wave rectifier to convert the bipolar signal to a unipolar PAM signal, a counting coder subjected to a compressing characteristic of only one polarity to produce PCM signals, a decoder to decode the output of the coder, and an amplitude comparator coupled to the decoder and rectifier to control the read out of the coder when the compressed, decoded signal equals the value of the output signal from the rectifier. These PCM signals and the control signal are transmitted to an expander-decoder having a complementary expanding characteristic of only one polarity to produce the unipolar signal from the PCM signal which then is converted to a bipolar signal under control of the control signal.

Figures 1, 2:
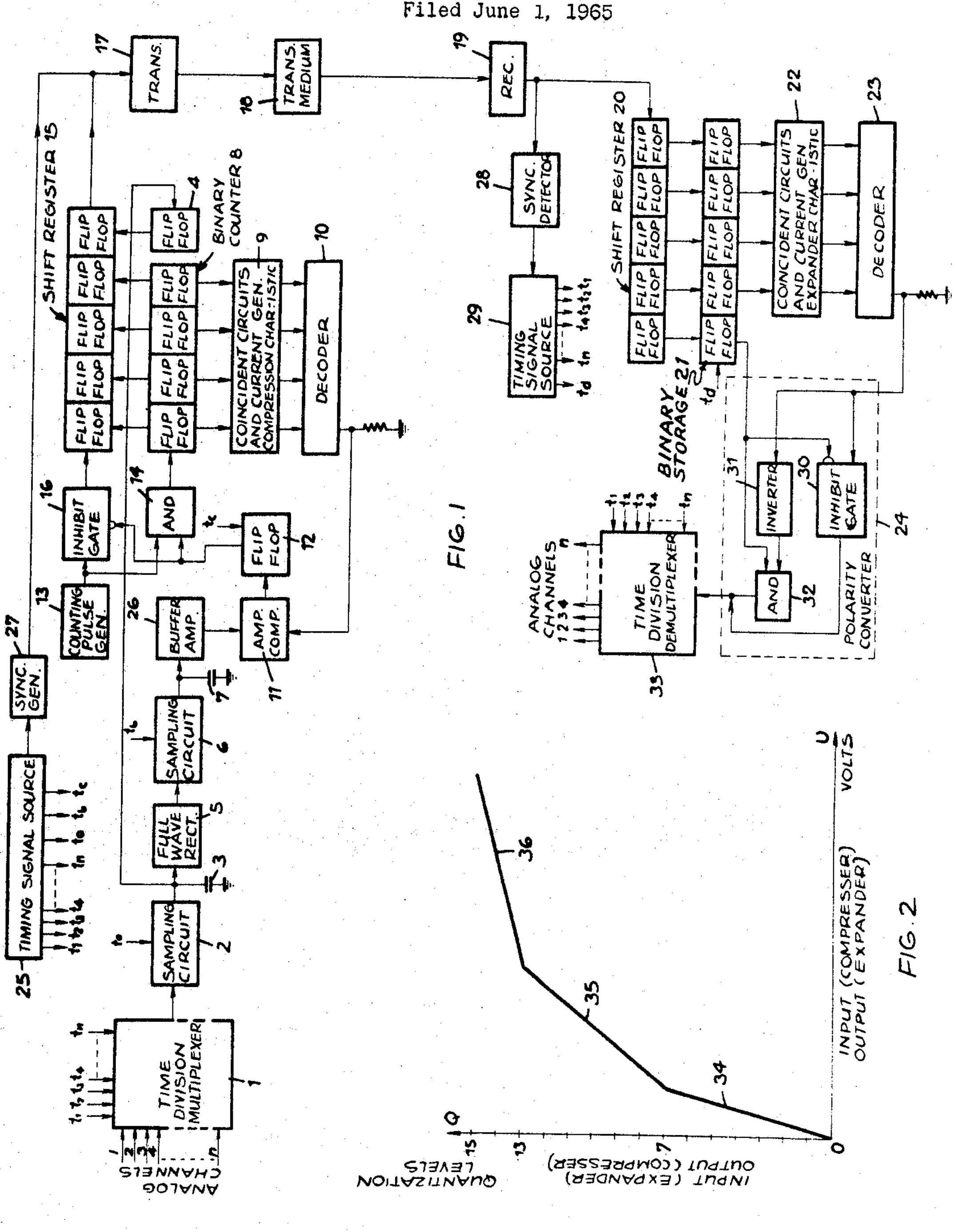

This invention relates to pulse code modulation systems and more particularly to compandor arrangements including non-linear coding and decoding system for utilization in pulse code modulation systems.

Where pulse code modulation techniques are employed for transmitting speech signals, it is known that compandor systems are employed to provide an improved utilization of the bandwidth of the coded signals. According to the prior art, the compandor system includes a compressor in the form of an instantaneous compressor prior to the coder, or the combination of an instantaneous compressor with the coder, and an expander in the form of an instantaneous expander after the decoder, or the combination of an instantaneous expander with the decoder. The compandor technique employed in the prior art requires a precise selection of the components forming the compressor and expander so that the compressing and expanding characteristics are exactly complementary or balanced to provide an overall linearity between the input and the output of the system. Further, it is required that the output level of the compressor be matched with the coder input and that the decoder output be matched to the expander input. Any inaccuracies in the matching of the components of the compressor and expander and the matching of the output-input of the compressor to the coder or the decoder to the expander cause an impairment in the transmission quality. In order to avoid these difficulties, it is known in the prior art to employ different types of non-linear coders and non-linear decoders where in the prior art the term "non-linear" is understood to imply that the resultant quantization levels of the coded signal includes between adjacent quantization levels an increasing amplitude difference with increasing signal amplitude.

It is further evident from the prior art arrangements that for negative and positive signal amplitudes the compressor and expander must have symmetrical compressing and expanding characteristics about the zero axis. This requirement demands, with regard to the circuitry known in the prior art, two equal compressing and expanding systems for positive and negative signal amplitudes.

An object of this invention is to provide a compandor arrangement for utilization in a pulse code modulation where the number of components and the expense thereof for the compressor and expander is decreased relative to the number of components and expense of the arrangements known in the prior art.

Another object of this invention is the provision of a non-linear coding and decoding system in which the balancing of the compressor and expander components can be omitted.

It is to be understood that when the term "non-linear" is employed in connection with the coding and decoding systems of this invention an arrangement is provided to maintain equal an amplitude difference or spacing between adjacent quantization levels with the compressor or expander characteristic being broken into a number of straight-line portions each having different slopes with each of these portions encompassing a different number of quantization levels where the first portion of the characteristic includes a larger number of quantization levels than the second adjacent portion of the characteristic which, in turn, has a larger number of quantization levels than the next adjacent portion. In other words, each portion of the characteristic includes more equally spaced quantization levels than the next succeeding characteristic portion but less than the preceding characteristic portions.

A feature of this invention is the provision of a pulse code modulation system comprising a source of bipolar amplitude signals, first means to produce a control signal indicative of the polarity of the bipolar amplitude signal, second means to convert the bipolar amplitude signal to a unipolar amplitude signal, third means to code the resultant unipolar amplitude signal in a predetermined non-linear manner, fourth means and fifth means to cooperate in the transmission and reception of the control signal and the coded signal, sixth means to decode the coded signal in a predetermined non-linear manner to recover the unipolar amplitude signal, and seventh means responsive to the control signal to convert the recovered unipolar amplitude signal to the bipolar amplitude signal.

Another feature of this invention is the provision of a predetermined non-linear coding arrangement operating in a predetermined non-linear manner having a predetermined non-linear characteristic which is one half of a given compression characteristic having a polarity equal to the polarity of the unipolar amplitude signal.

Still another feature of this invention is the provision of a decoder operating in a predetermined non-linear manner having a predetermined non-linear characteristic which is one half of a given expansion characteristic having a polarity equal to the polarity of the unipolar amplitude signal.

Still another feature of this invention is the provision of a full wave rectifier to convert the bipolar amplitude signal into the unipolar amplitude signal.

Still a further feature of this invention is the provision of an arrangement responsive to the control signal to convert the unipolar amplitude signal to the bipolar amplitude signal including means to produce the unipolar amplitude signal with both polarities and a means coupled thereto responsive to the control signal to select the unipolar amplitude signal with appropriate polarity for coupling to the output of the unipolar amplitude to bipolar amplitude converter.

Another feature of this invention is the provision of an arrangement to code the unipolar amplitude signal in accordance with a predetermined non-linear characteristic including a binary counting coder, means coupled to the coder to initiate the counting of the coder, and a non-linear decoder coupled to the coder to terminate the counting of the coder to produce the coded signal. The means to initiate the counting of the coder includes an amplitude comparator and a bistable device wherein the bistable device is caused to provide an enable pulse to start the counting of the binary counting coder and the amplitude comparator produces a signal to remove the enable pulse of the bistable device when the output of the non-linear decoder is equal to or greater than the amplitude of the unipolar amplitude signal.

It is immediately apparent that the expense of providing the full wave rectifier associated with the compressor and the unipolar amplitude to bipolar amplitude converter associated with the expander arrangement is substantially less than the expense to provide two compressing and expanding arrangements having precisely selected and balanced components to enable the realization of compressing and expanding signals having both negative and positive amplitudes. In other words, it is cheaper to provide the full wave rectifier and the unipolar amplitude to bipolar amplitude converter than it is to try to realize circuitry providing properly matched and balanced compressing and expanding characteristics symmetrically disposed about the zero axis.

The above-mentioned and other features and objects of this invention will become more apparent by reference to the following description taken in conjunction with the accompanying drawings, in which:

FIG. 1 is a schematic diagram in block form of an embodiment of a pulse code modulation system in accordance with the principles of this invention; and FIG. 2 is a graphic illustration of one of many nonlinear characteristics for both the compressor and expander arrangement of this invention.

Referring to FIG. 1, the pulse code modulation system in accordance with the principles of this invention can be broadly described as comprising a source of bipolar amplitude signal including, for instance, time division multiplexer 1, sampling circuit 2, and a storage device, such as condenser 3. To this source is coupled a first means, such as flip-flop 4, to provide a control signal indicative of the polarity of the bipolar amplitude signal stored in condenser 3. Coupled to the storage device, such as condenser 3, is a second means, such as full wave rectifier 5, sampling circuit 6 and a storage device, such as condenser 7, to convert the bipolar amplitude signal to a unipolar amplitude signal. A third means is coupled to condenser 7 to code the unipolar amplitude signal in a predetermined non-linear manner and includes binary counter 8, coincidence circuits and current generator 9, decoder 10, amplitude comparator 11, a bistable device, such as flip-flop 12, and counting pulse generator 13 which has its pulse output controlled by AND gate 14 for coupling to counter 8. The coded output and the control signal are transmitted by a means including, for instance, shift register 15 whose shifting operation is controlled by inhibit gate 16 coupled to counting pulse generator 13 and flip-flop 12 and transmitter 17. The transmitted signal is transmitted over transmission medium 18 to a receiving means for receiving the coded signal and the control signal including, for instance receiver 19 and shift register 20. Coupled to this receiving means for the purpose of decoding the coded signal and making available the control signal for further utilization is a means including binary storage 21, coincidence circuits and current generator 22, and decoder 23. Coupled to the output of the decoding means and responsive to the control signal is a polarity converter 24 to convert the decoded unipolar amplitude signal to a bipolar amplitude signal substantially equal to the bipolar amplitude signal present in the source of bipolar amplitude signal at the transmitter end of the system.

More specifically, the system of this invention includes a time division multiplexer 1 to receive a plurality of bipolar amplitude analog channels, such as speech channels.

Under control of timing signals $t_1$ through $t_n$ produced in timing signal source 25, multiplexer 1 presents a segment of each of the bipolar amplitude analog signals in the channels $t_1$ through $t_n$ to its output in time sequence. This time sequence output of multiplexer 1 is coupled to a sampling circuit 2 which under the control of timing signal $t_a$ of source 25 samples, in turn, each of the portions of the channel signals present in the sequential series output of multiplexer 1 to provide an instantaneous sample of each of the channel signals with these samples being bipolar amplitude samples. The sampling circuit 2 is necessary to provide a steady state bipolar amplitude sample which is not present at the output of multiplexer 1 due to the larger time interval each of the channel signals are permitted to pass to the output of multiplexer 1. The output of sampling circuit 2 is stored in a storage device, illustrated as condenser 3, for a sufficient length of time to convert this bipolar amplitude signal to a unipolar amplitude signal which then will be coded, as will be described hereinbelow.

It is important to note that the pulse train output of multiplexer 1 and the sampled pulses at the output of circuit 2 may assume either a positive polarity or a negative polarity depending upon the polarity of the signals of the analog channel and, thus, the signal stored in condenser 3 is bipolar in nature. Flip-flop 4 is coupled to condenser 3 and will produce a "0" output or "1" output, depending upon the polarity of the signal in condenser 3. For the purposes of explanation, let it be assumed that flip-flop 4 will produce a "0" output when the polarity of the signal stored in condenser 3 is positive and will produce a "1" output when the signal stored in condenser 3 is negative.

The signal stored in condenser 3 is also coupled to full wave rectifier 5 to produce a unipolar amplitude signal assumed, for the purposes of explanation, to be a positive signal but it should be noted that the technique described herein could also be employed in an arrangement where the output of the full wave rectifier 5 is a negative unipolar amplitude signal. The output of full wave rectifier 5 is coupled to sampling circuit 6 which, under control of timing signal $t_b$ from source 25, samples the unipolar amplitude signal and stores this sample in a storage device such as condenser 7. The stored signal in condenser 7 is coupled by means of buffer amplifier 26 to one input of amplitude comparator 11.

After the unipolar amplitude signal has been stored in condenser 7, flip-flop 12 is triggered to a "1" state by timing signal $t_c$ of source 25 to provide an enable pulse input to AND gate 14 which then will enable the passage of the counting pulses from generator 13 to binary counter 8. Binary counter 8 is illustrated, for purposes of explanation, to provide a four digit coded signal and thus includes four flip-flop stages which will count in the known binary manner the pulses supplied from generator 13 through AND gate 14 during the time that the enable pulse from flip-flop 12 is present. This enable pulse from flip-flop 12 is coupled to inhibit gate 16 to prevent the pulses from generator 13 to act upon shift register 14 to cause the shifting of information through this register to its output.

As binary counter 8 counts, the binary or digit output from each stage is coupled to coincidence circuits contained in arrangement 9. The coincidence circuits have coupled thereto current generators which will be enabled when a "1" output is delivered from the associated one of the stages of counter 8 and are arranged in such a way as to provide a nonlinear characteristic in the output of decoder 10. This characteristic generated by the arrangement 9 in conjunction with decoder 10 may take the form illustrated in FIG. 2 when referring to the compressor coordinate of the graph of FIG. 2 wherein the coordinate U is the input to the compressor arrangement 9 and the coordinate Q is the output of the compressor arrangement 9. The components and techniques employed in arrangement 9 and decoder 10 are more fully described in the copending application of M. L. Avignon et al., filed January 29, 1964, Serial No. 341,035 entitled "Non-Linear Decoder," now U.S. Patent No. 3,298,017, issued January 10, 1967. Attention is particularly directed to blocks 160 and 170 of FIG. 12 of this copending application and the appropriate portion of the specification describing the operation of these blocks.

When the analog or PAM output of decoder 10 equals or is greater than the amplitude of the signal stored in condenser 7, amplitude comparator 11 will produce an output, triggering flip-flop 12 to its "0" state. This will remove the enable pulse from AND gate 14 and stop the passage of pulses from generator 13 to counter 8, thereby stopping the count of the binary counter 8 with the resultant count being stored therein in the form of a "1" or "0" at output of each stage. In addition, the triggering of flip-flop 12 to its "0" state will remove the inhibit pulse from gate 16 and will enable the passing of pulses from generator 13 to shift register 15. Just prior to the arrival of pulses from generator 13 to register 15, the flip-flop stages in register 15 will be triggered by the output of the stages of binary counter 8 to the condition of these stages and, hence, the count of the binary counter 8. In addition, a fifth stage is employed in register 15 to store therein the control signal from flip-flop 4. As the pulses arrive from generator 13 at the input of shift register 15, the count of binary counter 8 and the control signal of flip-flop 4 will be shifted through register 15 to the input of transmitter 17 for transmission to a remote station through transmission medium 18.

Along with the coded signal produced by binary counter 8, in cooperation with the other components associated therewith, and the control signal from flip-flop 4, there is also provided a synchronizing signal at the input of transmitter 17. This synchronizing signal is produced in sync generator 27 under control of source 25. In a multiplex pulse train the synchronizing signal would occupy the position of one channel of the multiplex signal, usually the first channel.

The thusly formed signal at the input of transmitter 17 is transmitted through transmission medium 18 and received at receiver 19 which has its output coupled to synchronizing detector 28 to detect the synchronizing signal and accurately time timing signal source 29 to be in synchronism with timing signal source 25. The output of receiver 19 is also coupled to shift register 20 and stored in the five stages of the shift register with the last stage relative to the input of shift register 20 containing the control signal indicative of the polarity of the original bipolar amplitude signal. The other stages of register 20 are set to the count reached by binary counter 8. The output of the stages of register 20 are coupled to a binary storage arrangement 21 which is illustrated for purposes of explanation to include five binary flip-flops. A timing signal $t_d$ from timing signal source 29 is applied to the storage arrangement 21 which may include a coincidence gate at the output of the various stages of binary storage 21 to read out the information stored in binary storage 21 at the appropriate time, this appropriate time being that time when the information stored in storage 21 is the same information stored in binary counter 8 and flip-flop 4, that is, adjacent the end of the channel time of the multiplex pulse train.

The outputs from the first four stages of binary storage 21 are coupled to the coincidence circuits and current generator of the expander arrangement 22 which may take the form described hereinabove with respect to arrangement 9, but being arranged to provide an expander characteristic such as illustrated in FIG. 2 when the coordinate Q is considered to be the input to the expander and the coordinate U is considered to be the output from the expander. The current passed by the coincidence circuits as controlled by the condition of the first four stages of binary storage 21 is passed to decoder 23 which may take the same form as decoder 10 and produces at its output the decoded unipolar amplitude signal. It should be noted that the arrangement 22 and decoder 23 may take the form of the similar arrangements described in the above-cited copending application and, in particular, blocks 160 and 170 of FIG. 12, thereof.

The output of decoder 23 is coupled to polarity converter 24 which, for purposes of explanation, may take the form illustrated. The arrangement illustrated is inhibit gate 30 and inverter 31 receiving simultaneously the unipolar amplitude signal at the output of decoder 23. The output of inverter 31 is coupled to AND gate 32. Thus, there is available both polarities of the decoded unipolar amplitude signal. Both the inhibit gate 30 and the AND gate 32 are controlled from the last flip-flop of binary storage 21 which stores the polarity indicating control signal. Employing the example assumed hereinabove for the control signal, a "0" is stored in the last stage of binary storage 21 when the bipolar amplitude signal is positive. Thus, AND gate will not be activated and the inhibit gate 30 will not be inhibited thereby enabling positive polarity unipolar amplitude signals to be available at the output of converter 24 for coupling to the time division demultiplexer 33. If, on the other hand, the control signal present in the last stage of binary storage 21 is a "1," it is immediately known that the bipolar amplitude signal was negative. Thus, the "1" condition of the last stage of storage 21 provides an enable pulse which is coupled to inhibit gate 30 to inhibit the passage of positive unipolar amplitude signal therethrough. This same enable gate will open AND gate 32 and pass the inverted version, or negative polarity, unipolar amplitude signals to demultiplexer 33.

Time division demultiplexer 33 receives the time division multiplex signal now present again as bipolar amplitude signals and through the cooperation of the timing signals $t_1$ through $t_n$ will separate the time division channel signals for application to their appropriate output channels 1 through *n*.

It should be noted that one embodiment of the pulse code modulation system of this invention has been illustrated and demonstrated in connection with FIG. 1. It would be possible to provide a compressor having a characteristic corresponding to one branch of a predetermined compression characteristic coupled to the input of the coder instead of being combined with the coder as illustrated and described in connection with FIG. 1. Also the expanding arrangement of the system could employ an expander arrangement to provide one branch of a predetermined expander characteristic to act upon the signal after being decoded instead of prior to the decoding operation.

It should be noted that various timing signals in the transmitter portion and receiver portion of the system of FIG. 1 have been described broadly. It is believed to be well known by those skilled in the art the various relationships between these timing signals that would be necessary to enable the operation of the system of FIG. 1 as described since these relationships between the timing signals are believed to be well known in the art and, thus, no detailed relationship of these signals need be spelled out in the present application.

It will be also obvious to those skilled in the art that appropriate reset signals would be required for shift registers 15 and 20, binary counter 8, flip-flop 4, binary storage 21 which could be derived from timing signal sources 25 and 29 to make sure that these binary components are returned to their proper starting condition before the next signal is processed. These reset signals have not been shown to prevent confusion of the drawings and, further, since it is believed to be well known by those skilled in the art how to provide and where to couple these reset signals.

Referring to FIG. 2, which has been previously mentioned in the description of FIG. 1, there is illustrated one branch of a compressor characteristic which could be employed in this invention. It should be noted, however, that there are many other compression characteristics which could be employed and the one illustrated in FIG. 2 is merely for purposes of explanation. It should be further noted that due to the labeling of the coordinates this same characteristic is the expander characteristic when coordinate Q is considered to be the input of the expander and coordinate U the output of the expander, while coordinate U is the input of the compressor and coordinate Q is the output of the compressor. The curve of FIG. 2 also demonstrates that the term "non-linear" as employed in connection with this invention refers to the arrangement where portion 34 of the characteristic curve encompasses seven quantization levels, portion 35 of the characteristic curve encompasses six quantization levels, while portion 36 of the characteristic curve encompasses only two quantization levels for the arrangement illustrated in FIG. 1 wherein four digits are employed to convey the amplitude information in coded form of the unipolar amplitude signal, these four digits enabling the realization of sixteen quantization levels.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse code modulation system comprising:
a source of bipolar amplitude signal;
first means coupled to said source to produce a control signal indicative of the polarity of said bipolar amplitude signal;
second means coupled to said source to convert said bipolar amplitude signal to a unipolar amplitude signal;
third means coupled to said second means to code said unipolar amplitude signal in a predetermined non-linear manner including a binary counting means responsive to the amplitude of said unipolar amplitude signal;
fourth means coupled to said first means and said third means to transmit said control signal and said coded signal;
fifth means coupled to said fourth means to receive said control signal and said coded signal;
sixth means coupled to said fifth means to convert said coded signal in a predetermined non-linear manner directly to said unipolar amplitude signal; and
seventh means coupled to said sixth means and said fifth means responsive to said control signal to convert said unipolar amplitude signal to said bipolar amplitude signal.

2. A system according to claim 1, wherein said second means includes a full wave rectifier.

3. A pulse code modulation system comprising:
a source of bipolar amplitude signal;
first means coupled to said source to produce a control signal indicative of the polarity of said bipolar amplitude signal;
second means coupled to said source to convert said bipolar amplitude signal to a unipolar amplitude signal;
third means coupled to said second means to code said unipolar amplitude signal in a predetermined non-linear manner;
fourth means coupled to said first means and said third means to transmit said control signal and said coded signal;
fifth means coupled to said fourth means to receive said control signal and said coded signal;
sixth means coupled to said fifth means to decode said coded signal in a predetermined non-linear manner to recover said unipolar amplitude signal; and
seventh means coupled to said sixth means and said fifth means responsive to said control signal to convert said unipolar amplitude signal to said bipolar amplitude signal;
said third means including
a binary counting coder,
eighth means coupled to said coder and said second means to initiate the counting of said coder, and
a non-linear decoder coupled to said coder and said eighth means to terminate the counting of said coder to produce said coded signal.

4. A system according to claim 3, wherein said eighth means includes
an amplitude comparator coupled to said decoder and said second means.

5. A system according to claim 1, wherein said seventh means includes
ninth means to produce said unipolar amplitude signal with both polarities, and
means coupled to said ninth means responsive to said control signal to select said unipolar amplitude signal with appropriate polarity for coupling to the output of said seventh means.

6. A system according to claim 1, wherein said sixth means includes
a non-linear decoder.

7. A system according to claim 6, wherein
said seventh means includes
ninth means coupled to said decoder to produce said unipolar amplitude signal with both polarities, and
means coupled to said ninth means responsive to said control signal to select said unipolar amplitude signal with appropriate polarity for coupling to the output of said seventh means.

8. A pulse code modulation system comprising:
a source of bipolar amplitude signal;
first means coupled to said source to produce a control signal indicative of the polarity of said bipolar amplitude signal;
second means coupled to said source to convert said bipolar amplitude signal to a unipolar amplitude signal;
third means coupled to said second means to code said unipolar amplitude signal in a predetermined non-linear manner;
fourth means coupled to said first means and said third means to transmit said control signal and said coded signal;
fifth means coupled to said fourth means to receive said control signal and said coded signal;
sixth means coupled to said fifth means to decode said coded signal in a predetermined non-linear manner to recover said unipolar amplitude signal; and
seventh means coupled to said sixth means and said fifth means responsive to said control signal to convert said unipolar amplitude signal to said bipolar amplitude signal;
said second means including
a full wave rectifier; said third means including
a binary counting coder,
eighth means coupled to said coder to initiate the counting thereof,
a first non-linear decoder coupled to said coder, and
an amplitude comparator coupled to said first decoder and said full wave rectifier to terminate the counting of said coder to produce said coded signal;
said sixth means including a second non-linear decoder; and
said seventh means including
ninth means coupled to said second decoder to produce said unipolar amplitude signal with both polarities, and
means coupled to said ninth means responsive to said control signal to select said unipolar amtude signal with appropriate polarity for coupling to the output of said seventh means.

9. A pulse code modulation system comprising:
a source of bipolar amplitude signal;
first means coupled to said source to produce a control signal indicative of the polarity of said bipolar amplitude signal;
second means coupled to said source to convert said bipolar amplitude signal to a unipolar amplitude signal;
third means coupled to said second means to produce in accordance with a first predetermined non-linear characteristic a coded signal representative of the amplitude of said unipolar amplitude signal including a binary counting means responsive to the amplitude of said unipolar amplitude signal;
fourth means coupled to said first means and said third means to transmit said control signal and said coded signal;
fifth means coupled to said fourth means to receive said control signal and said coded signal;
sixth means coupled to said fifth means to convert said coded signal, in accordance with a second predetermined non-linear characteristic, directly to the amplitude of said unipolar amplitude signal; and
seventh means coupled to said sixth means and said fifth means responsive to said control signal to convert said unipolar amplitude signal to said bipolar amplitude signal.

10. A pulse code modulation system comprising:
a source of bipolar amplitude signal;
first means coupled to said source to produce a control signal indicative of the polarity of said bipolar amplitude signal;
second means coupled to said source to convert said bipolar amplitude signal to a unipolar amplitude signal;
third means coupled to said second means to produce in accordance with a first predetermined non-linear characteristic a coded signal representative of the amplitude of said unipolar amplitude signal;
fourth means coupled to said first means and said third means to transmit said control signal and said coded signal;
fifth means coupled to said fourth means to receive said control signal and said coded signal;
sixth means coupled to said fifth means to produce from said coded signal in accordance with a second predetermined non-linear characteristic the amplitude of said unipolar amplitude signal; and
seventh means coupled to said sixth means and said fifth means responsive to said control signal to convert said unipolar amplitude signal to said bipolar amplitude signal;
said third means including;
a binary counting coder,
eighth means coupled to said coder responsive to the binary outputs therefrom to generate an analog signal in accordance with said first predetermined characteristic representing said binary outputs, and
an amplitude comparator coupled to said eigth means and said second means to stop the counting of said coder when said analog signal and said unipolar amplitude signal have at least achieved equality.

11. A pulse code modulation system comprising:
a source of bipolar amplitude signals;
first means coupled to said source to produce a control signal indicative of the polarity of said bipolar amplitude signal;
second means coupled to said source to convert said bipolar amplitude signal to a unipolar amplitude signal of given polarity;

a pulse generator;
a binary counter coupled to said pulse generator to produce in sequence a different binary count for each of a plurality of quantized amplitude levels of said given polarity;
a non-linear decoder coupled to said binary counter to produce in accordance with a first predetermined non-linear characteristic an analog signal representing each of said quantized amplitude levels;
third means coupled to said decoder and said second means to detect equality between the amplitude of the output of said decoder and the amplitude of the output of said second means and stop said counter at a binary count representing one of said quantized amplitude levels;
fourth means coupled to said third means to transmit the binary count of said counter and said control signal to a remote location;
fifth means disposed at said remote location coupled to said fourth means to alter the value represented by said binary count at the output of said fourth means in accordance with a second predetermined non-linear characteristic; and
sixth means coupled to said fourth and fifth means to convert said unipolar amplitude signal to said bipolar amplitude signal under control of said control signal.

12. A system according to claim 11, wherein
said fifth means includes a second non-linear decoder; and
said sixth means includes
seventh means coupled to said second decoder to produce said unipolar amplitude signal with both polarities, and
means coupled to said seventh means responsive to said control signal to select said unipolar amplitude signal with appropriate polarity for coupling to the output of said sixth means.

13. A pulse code modulation transmitter comprising:
a source of bipolar amplitude signal;
first means coupled to said source to produce a control signal indicative of the polarity of said bipolar amplitude signal;
second means coupled to said source to convert said bipolar amplitude signal to a unipolar amplitude signal; and
third means coupled to said second means to produce in accordance with a predetermined non-linear characteristic a coded signal representative of the amplitude of said unipolar amplitude signal including a binary counting means responsive to the amplitude of said unipolar amplitude signal.

14. A pulse code modulation receiver comprising:
first means to receive a control signal indicative of the polarity of a bipolar amplitude signal and a coded signal representing the amplitude of a unipolar amplitude signal derived from said bipolar amplitude signal, said amplitude being distorted in accordance with a first predetermined non-linear characteristic;
second means coupled to said first means responsive to said coded signal to convert said coded signal, in accordance with a second predetermined non-linear characteristic, directly to the amplitude of said unipolar amplitude signal; and
third means coupled to said first means and said second means responsive to said control signal to convert said unipolar amplitude signal to said bipolar amplitude signal.

15. A pulse code modulation system comprising:
a first station including
a source of bipolar amplitude signal,
a first means coupled to said source to produce a control signal indicative of the polarity of said bipolar amplitude signal,
second means coupled to said source to convert said bipolar amplitude signal to a unipolar amtude signal, and third means coupled to said second means to produce in accordance with a first predetermined non-linear characteristic a coded signal representative of the amplitude of said unipolar amplitude signal including a binary counting means responsive to the amplitude of said unipolar amplitude signal;

a second station remote from said first station including fourth means responsive to said coded signal to convert said coded signals, in accordance with a second predetermined non-linear characteristic, directly to the amplitude of said unipolar amplitude signal, and fifth means coupled to said fourth means responsive to said control signal to convert said unipolar amplitude signal to said bipolar amplitude signal; and means coupling said coded signal and said control signal from said first station to said second station.

References Cited

UNITED STATES PATENTS

| | | | |
|---|---|---|---|
| 2,592,308 | 4/1952 | Meacham | 325—38 |
| 3,097,338 | 7/1963 | Pinet et al. | 325—38 |
| 3,234,544 | 2/1966 | Marenholtz | 340—347 |
| 3,320,534 | 5/1967 | Altonji | 325—38 |

ROBERT L. GRIFFIN, *Primary Examiner.*

J. T. STRATMAN, *Assistant Examiner.*